United States Patent [19]

Hashimoto et al.

[11] Patent Number: 4,781,965
[45] Date of Patent: * Nov. 1, 1988

[54] MAGNETIC RECORDING MEDIUM

[75] Inventors: Hiroshi Hashimoto; Noburo Hibino; Tsutomu Okita, all of Kanagawa, Japan

[73] Assignee: Fuji Photo Film Co., Ltd., Kanagawa, Japan

[*] Notice: The portion of the term of this patent subsequent to May 12, 2004 has been disclaimed.

[21] Appl. No.: 657,991

[22] Filed: Oct. 5, 1984

[30] Foreign Application Priority Data

Oct. 5, 1983 [JP] Japan ................. 58-187519

[51] Int. Cl.$^4$ ............................. G11B 5/702
[52] U.S. Cl. ..................... 428/143; 427/44; 427/128; 427/131; 428/148; 428/216; 428/694; 428/695; 428/900; 428/425.9; 428/522
[58] Field of Search ................. 427/44, 128, 131; 428/694, 900, 143, 148, 216, 425.9, 522; 360/134–136

[56] References Cited

U.S. PATENT DOCUMENTS

| 4,468,436 | 8/1984 | Okita | 428/694 |
| 4,496,626 | 1/1985 | Kasuga | 427/132 |
| 4,511,629 | 4/1985 | Konno | 428/694 |
| 4,619,856 | 10/1986 | Kamada | 427/44 |
| 4,664,964 | 5/1987 | Okita | 427/44 |
| 4,664,965 | 5/1987 | Okita | 427/44 |
| 4,686,149 | 8/1987 | Aonuma | 427/44 |

Primary Examiner—Ellis P. Robinson
Attorney, Agent, or Firm—Sughrue, Mion, Zinn, Macpeak and Seas

[57] ABSTRACT

A magnetic recording medium is described, comprising a non-magnetic support having coated thereon a non-magnetic layer and a magnetic layer in that order, with the surface roughness of the surface of the support on the side opposite from the magnetic layer being 0.007 μm or more, and the non-magnetic layer being provided by coating and radiation-exposing a compound that is polymerizable by radiation exposure.

8 Claims, No Drawings

MAGNETIC RECORDING MEDIUM

FIELD OF THE INVENTION

The present invention relates to a magnetic recording medium, and more particularly to a magnetic recording medium useful for high density recording.

BACKGROUND OF THE INVENTION

Magnetic recording media for high density recording have been developed, and thus better surface smoothness of the magnetic layer of the magnetic recording medium is required to reduce space loss between a magnetic head and a magnetic recording tape. For this purpose, it is necessary to improve the surface smoothness of a magnetic layer. The surface smoothness of a magnetic layer can be improved by improving methods for preparing magnetic recording media, for example, with respect to method of dispersing the magnetic particles, coating methods, surface molding methods (e.g., calendering treatment) and by improving surface smoothness of a support thereunder. Also, attempts have been made to make magnetic recording layers thinner in order to reduce loss which is caused due to the thickness of the layer, because the recording wavelength becomes shorter with increases in the recording density. Accordingly, the higher surface smoothness of the support is required as the thinner magnetic layer is provided thereon.

However, it is limited by the following reasons to increase the surface smoothness of a plastic film support which is used for a magnetic recording medium. That is, if the surface smoothness of the support is good, it does not move smoothly in the step of winding it which is conducted after a film-molding (e.g., calendering) step, and wrinkles generate on the film, because the friction resistance of the film to rollers for transporting the film is increased. Also, the shape of a wound film is not uniform, because friction resistance between opposite surfaces of the rolled film is increased.

Various methods have been proposed to overcome the foregoing problems. For example, it is disclosed in Japanese Patent Application (OPI) No. 109,605/83 (the term "OPI" as used herein means a "published unexamined Japanese patent application") that fine particles of thermoplastic resins which are present on a support can be removed by dissolving them with a solvent, and then a magnetic layer is coated on the support. However, even this method has not been able to provide satisfactory characteristics necessary for a magnetic recording medium used for high density recording medium.

SUMMARY OF THE INVENTION

A first object of the present invention is to provide a magnetic recording medium having better video characteristics.

A second object of the present invention is to provide a magnetic recording medium having better S/N ratio.

As a result of extensive research, it has now been found that the above objects of the present invention can be attained by providing a non-magnetic layer provided by coating and radiation-exposing a compound polymerizable by radiation exposure between a magnetic layer and a support, with the surface of the support on the side opposite from the magnetic layer (hereafter referred to as the "back surface of the support") has a surface roughness of 0.007 μm or more (cut off 0.25 mm). According to a preferred embodiment, the non-magnetic layer has a surface roughness of 0.005 μm or less on the surface on which the recording layer is provided.

That is, the present invention relates to (1) a magnetic recording medium comprising a non-magnetic support having provided thereon a non-magnetic layer and a magnetic layer in that order, with the back surface of the support having surface roughness of 0.007 μm or more, and said non-magnetic layer being provided by coating a composition containing a polymerizable compound and exposing it to radiation, and it relates to (2) a magnetic recording medium as described in (1) wherein the surface roughness of the non-maqnetic layer (intermediate layer) is 0.005 μm or less on the surface on which the magnetic layer is provided.

DETAILED DESCRIPTION OF THE INVENTION

A non-magnetic support of which opposite surfaces have different surface roughness can be prepared, but the preparation of such a support requires high technical skills, and the production efficiency is generally low. Therefore, the support used in this invention generally has nearly the same surface roughness on both surfaces, but the invention is not limited thereto.

The support used in the present invention includes polyesters such as polyethylene terephthalate or polyethylene-2,6-naphthalate; polyolefins such as polyethylene or polypropylene; cellulose derivatives such as cellulose triacetate, cellulose diacetate, cellulose acetate butyrate or cellulose acetate propionate; vinyl type resins such as polyvinyl chloride or polyvinylidene chloride; other plastics such as polycarbonate, polyimide or polyamide imide; non-magnetic metals such as aluminum, copper, tin, zinc or a non-magnetic alloy including the above metals or stainless copper; and a baryta paper or a paper coated or laminated with α-polyolefins having from 2 to 10 carbon atoms, such as polyethylene, polypropylene, or an ethylenebutene copolymer.

The surface roughness referred to in the present invention is a center line average roughness which is defined in JIS-B 0601, page 5. The cut off value is 0.25 mm.

The surface roughness of the support used in the present invention is generally from 0.007 μm to 0.05 μm, and a particularly preferred roughness is from 0.015 μm to 0.5 μm.

The surface roughness of the support can be controlled in a conventional manner. For example, when paper or plastic supports are used, it can be controlled by adjusting the particle size and amount of inorganic fine particles (e.g., $TiO_2$, $CaCO_3$, etc.) to be added therein. When non-magnetic metals are used as the support, a desired surface roughness can be obtained by adjusting the roughness of cloth used in a buff treatment of metals.

A backing layer can be provided on the back surface of the support for the purpose of improving running properties. The advantage of the present invention is more effective where the surface roughness of the backing layer is 0.007 μm or more, and preferably from 0.015 μm or more.

In the present invention, the intermediate layer having a smooth surface can be easily obtained using compounds capable of being polymerized by radiation exposure since a coated layer of the compound is polymerized and solidified within a short period of time (e.g., less than several seconds) without degrading the surface property of the coated layer.

Compounds which are polymerized in the intermediate layer of the present invention and are polymerized by radiation exposure include compounds having at least one carbon-carbon unsaturated bond in the molecule. Typical examples of the compounds include acrylates, acrylamides, methacrylates, methacrylamides, allyl compounds, vinyl ethers, vinyl esters, heterocyclic vinyl compounds, N-vinyl compounds, styrenes, crotonic acids, itaconic acids and olefines. Preferred compounds among these compounds include the compounds containing at least two acryloyl groups or methacryloyl groups, such as acrylates (e.g., diethylene glycol diacrylate, triethylene glycol diacrylate, tetraethylene glycol diacrylate, trimethylol propane triacrylate or pentaerythritol tetraacrylate), methacrylates (e.g., diethylene glycol dimethacrylate, triethylene glycol trimethacrylate, tetraethylene glycol dimethacrylate, trimethylol propane trimethacrylate or pentaerythritol tetramethacrylate) or esters of polyols having two or more functional groups and acrylic or methacrylic acid.

These compounds can be high molecular weight compounds. Preferred compounds have acrylate or methacrylate bond at the end of the main chain or side chains of the high molecular structure, and are disclosed, e.g., in *Fatipec Congress*, A. Vranckem, Vol. 11, p. 19 (1972). An example is shown below.

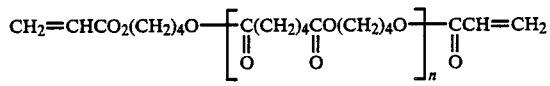

The skeleton of the above described compound can be a polyurethane skeleton, an epoxy resin skeleton, a polyether skeleton, a polycarbonate skeleton or a mixture thereof. The molecular weihht of the compound is preferably from 1,000 to 20,000, but is not particularly limited.

The above-described compounds which can be polymerizable by radiation exposure can be used alone or in combinations having an optional mixing ratio thereof.

Additionally, thermoplastic resins such as vinyl chloride-vinyl acetate copolymer, cellulose type resin; acetal type resin, vinyl chloride-vinylidene chloride type resin, urethane resin or an acrylonitrile-butadiene resin can be used in combination with the compound(s) which can be polymerized by radiation exposure, if desired. The thermoplastic resins can be generally added upto 50 wt %, preferably upto 30 wt %, based on the weight of the intermediate layer.

The radiation used in the present invention is an electron beams or an ultraviolet ray. When an ultraviolet ray is used, a photopolymerization initiator should be added to the above described compounds. For example, an aromatic ketone can be used as a photopolymerization initiator. The aromatic ketone is not particularly limited, but a ketone which has a relatively larger absorption coefficient at the wavelengths of 254 nm, 313 nm and 365 nm (i.e., the line spectrum of a mercury lamp generally used as an ultraviolet irradiation light source) is preferred. Typical examples include various aromatic ketones such as acetophenone, benzophenone, benzoin ethyl ether, benzyl methyl ketal, benzyl ethyl ketal, benzoin isobutyl ketone, hydroxy dimethyl phenyl ketone, 1-hydroxycyclohexyl phenyl ketone, 2,2-diethoxy acetophenone or Michler's ketone. The aromatic ketones can be used in a mixing ratio of from 0.5 to 20 parts by weight, preferably from 2 to 15 parts by weight, and more preferably from 3 to 10 parts by weight, per 100 parts by weight of the polymerizable compounds.

When the polymerizable compound polymerizable is coated on a support alone or in combination with the aromatic ketone, various organic solvents can be used, if desired. When the compound is a liquid at a normal temperature, a solvent is not necessary. Organic solvents that can be used according to the present invention include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or monoethyl ether of glycol acetate; glycol ethers such as ether, glycol dimethyl ether, glycol monoethyl ether or dioxane; tars (aromatic hydrocarbons) such as benzene, toluene or xylene; and methylene chloride, ethylene chloride, carbon tetrachloride, chloroform, ethylene chlorohydrin or dichlorobenzene.

The intermediate layer preferably has a thickness of from 0.1 to 2 μm after it is hardened by polymerization with radiation exposure. It preferably has a surface roughness of 0.005 μm or less. The surface roughness can be effectively adjusted to the above range utilizing a leveling effect. That is, a compound having a comparatively low viscosity (generally 1,000 cP or less, preferably 300 cP or less, more preferably 100 cP or less) is desirably employed or an organic solvent is used to adjust the coating composition to have a low viscosity of 300 cP or less, preferably 100 cP or less and more preferably 50 cP or less.

A scanning method using a van de Graff accelerator, a double scanning method, or a curtain beam method can be used for accelerating electron beams. A curtain beam method is preferred because of its comparatively low cost and its large output amount.

The electron beam irradiation can be carried out using an accelerating voltage of from 10 to 1,000 kV, preferably from 50 to 300 kV, and an absorption dose of 0.5 to 20 megarads, preferably 1 to 10 megrads. When the accelerating voltage is less than 10 kV, the transmitted amount of energy is insufficient and when the accelerating voltage exceeds 1,000 kV, the energy efficiency used for polymerization decreases and is uneconomical. When the absorption dose is less than 0.5 megarad, the hardening reaction is insufficient to obtain the desired mechanical strength in the intermediate layer. When the absorption dose is more than 20 megarads, the energy efficiency used for hardening reaction is lowered or the irradiated object generates heat whereby a plastic support tends to deform.

The magnetic layer provided on the intermediate layer hardened by polymerization in the present invention can be mainly composed of a ferromagnetic particle and a binder, or can be a ferromagnetic thin metal film.

The method for forming the magnetic thin metal film used in the present invention can include a method wherein the film is formed in a vacuum chamber or a plating method. The method of forming the film in a vacuum chamber is preferred, because the rate of forming the thin metal film is high, the manufacturing steps are simple, and treatment for the waste solution is unnecessary. The method for forming the film in the vacuum chamber includes a vacuum deposition method, a sputtering method, an ion plating method or a chemical gas phase plating method which comprises vaporizing or ionizing a substance or a compound to be separated under a thin gas condition or under vacuum condition and depositing it on a support.

A ferromagnetic metal layer used as a magnetic recording layer in the present invention can be prepared in a vacuum chamber using a ferromagnetic metal such as iron, cobalt or nickel or a ferromagnetic alloy such as Fe-Co, Fe-Ni, Co-Ni, Fe-Si, Fe-Rh, Co-P, Co-B, Co-Si, CoV, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, or Co-Sm-Cu, or by a plating method. The magnetic thin metal layer has a thickness of from 0.05 μm to 2 μm and a particularly preferred thickness is from 0.1 μm to 0.4 μm.

Ferromagnetic particles, various additives, organic solvents, and dispersing and coating methods used in the present invention are disclosed, e.g., in U.S. Pat. Nos. 4,135,016 and 4,205,353, and Japanese Patent Application (OPI) No. 46,011/79.

The present invention is further illustrated in more detail by the following Examples and Comparative Examples. In the Examples and Comparative Examples all parts are by weight.

EXAMPLE 1

Diethylene glycol diacrylate was coated on a polyethylene terephthalate film having a thickness of 14.5 μm which was then irradiated with an electron beam curtain under an accelerating voltage of 100 kV and beam current of 5 mA having an absorption dose of 5 Mrads.

The surface roughness of the surface of the support on the side opposite from the magnetic layer was 0.007 μm and the coated thickness was 0.5 μm.

A magnetic coating composition having the following formulation was mixed, kneaded, and dispersed in a ball mill for 10 hours.

| | |
|---|---|
| Co—containing γ-Fe₂O₃ (Hc: 630 Oe; particle size: 0.4 × 0.05 × 0.05 μm) | 300 parts |
| Polyester polyurethane (Reaction product of ethylene adipate and 2,4-tolylene diisocyanate; molecular weight equivalent to styrene: about 130,000) | 35 parts |
| Copolymer of vinyl chloride-vinyl acetate-maleic anhydride (Maleic acid content: 3.0 wt %; polymerization degree: about 400) | 30 parts |
| Dimethyl polysiloxane (polymerization degree: about 60) | 2 parts |
| Butyl acetate | 300 parts |
| Methyl isobutyl ketone | 300 parts |

After dispersion, 22 parts of 75 wt % ethyl acetate solution of an adduct of trimethylol propane and triisocyanate compound (molecular weight: about 760; NCO content: 13.3 wt%, trademark "Desmodule L-75" manufactured by Bayer A.G.) was added thereto and dispersed under high speed shearing force to prepare a magnetic coating composition. The resulting coating composition was coated on the above described layer in a dry thickness of 4 μm. The magnetic layer was subjected to orientation in a magnetic field under a direct current, dried by forced hot air at 100° C, was subjected to a calendering treatment, and was slit to a width of ½ inch to prepare a video magnetic tape Sample No. 1.

COMPARATIVE EXAMPLE 1

The same procedure as in Example 1 was repeated, except without providing a layer which was hardened by polymerization with radiation exposure to prepare Sample No. 2.

EXAMPLE 2

The same procedure as in Example 1 was repeated, except that the following composition was used instead of diethylene glycol diacrylate, and the thus-coated layer was irradiated by a mercury lamp having 80 W/cm for 1 second, to have a thickness of 0.5 μm. Thus obtained magnetic tape was designated as Sample No. 3.

| | |
|---|---|
| Diethylene glycol diacrylate | 95 parts |
| Benzophenone | 5 parts |

EXAMPLE 3

The same procedure as in Example 1 was repeated, except that a polyethylene terephthalate film having a surface roughness of 0.015 μm on the back surface was used, to prepare Sample No. 4.

COMPARATIVE EXAMPLE 2

The same procedure as in Comparative Example 1 was repeated except that a polyethylene terephthalate film having a surface roughness of 0.015 μm on the back surface was used, to prepare Sample No. 5.

EXAMPLE 4

The same procudure as in Example 1 was repeated except that a polyethylene terephthalate film having a surface roughness of 0.020 μm on the back surface was used, to prepare Sample No. 6.

COMPARATIVE EXAMPLE 3

The same procedure as in Comparative Example 1 was repeated except that a polyethylene terephthalate film having a surface roughness of 0.020 μm on the back surface was used, to prepare Sample No. 7.

EXAMPLE 5

The same procedure as in Example 1 was repeated except that the layer which had been polymerized and hardened by radiation exposure was subjected to oblique vapour deposition to prepare a Co-Ni (Ni: 20 wt%) magnetic layer having a 1,000 Å thickness. The resulting magnetic tape was designated as Sample No. 8.

COMPARATIVE EXAMPLE 4

The same procedure as in Example 5 was repeated except that the layer polymerized and hardened by radiation exposure was not provided, to thus prepare Sample No. 9.

COMPARATIVE EXAMPLE 5

The same procedure as in Example 1 was repeated except that the following composition was coated instead of diethylene glycol diacrylate, and the coated layer was dried to form an intermediate layer having a thickness of 0.5 μm. Thus obtained magnetic tape was designated as Sample No. 10.

| | |
|---|---|
| Copolymer of vinyl chloride-vinyl acetate (polymerization degree: about 300) | 100 parts |
| Methyl ethyl ketone | 2,000 parts |

EXAMPLE 6

The same procedure as in Example 4 was repeated except that the following coating composition was used instead of diethylene glycol diacrylate, to prepare Sample No. 11.

Video sensitivities and C/N rations with regard to those samples were measured, in the following manner.

Video sensitivity: The reproduced output was determined at 4 MHz using VHS system VTR ("NV-8800", trade name, manufactured by Matsushita Electric Industries Co., Ltd.)

C/N ratio: A carrier wave at 3 MHz and 3.5 MHz was recorded on sample tapes. When the tapes were replayed, the carrier and noise were measured. C/N was the ratio of carrier to noise of each sample (corresponding to a signal to noise ratio) and was shown by a relative value when the ratio in Comparative Example 1 was ±0 dB.

The results are shown in the Table.

TABLE

| Sample No. | Example and Comparative Example | Surface roughness at back surface of support (μm) | Features of samples | Surface roughness of polymerized layer (μm) | Video sensitivities (dB) | C/N (dB) at 3 MHz | C/N (dB) at 3.5 MHz |
|---|---|---|---|---|---|---|---|
| 1 | Example 1 | 0.007 | Polymerized layer: diethylene glycol diacrylate | 0.004 | ±1.2 | +0.5 | +2.1 |
| 2 | Comparative Example 1 | 0.007 | Polymerized layer: absent | — | ±0 | ±0 | ±0 |
| 3 | Example 2 | 0.007 | Polymerized layer: diethylene glycol diacrylate (95%) + benzophenone (5%) | 0.004 | +1.1 | +0.5 | +2.0 |
| 4 | Example 3 | 0.015 | Polymerized layer: diethylene glycol diacrylate | 0.005 | +1.0 | +0.5 | +2.0 |
| 5 | Comparative Example 2 | 0.015 | Polymerized layer: absent | — | −1.0 | −0.7 | −1.2 |
| 6 | Example 4 | 0.020 | Polymerized layer: diethylene glycol diacrylate | 0.005 | +0.9 | +0.4 | +1.8 |
| 7 | Comparative Example 3 | 0.020 | Polymerized layer: absent | — | −2.1 | −1.2 | −1.8 |
| 8 | Example 5 | 0.007 | Polymerized layer: diethylene glycol diacrylate Magnetic layer: Co/Ni thin film | 0.004 | +3.5 | +1.5 | +3.2 |
| 9 | Comparative Example 4 | 0.007 | Polymerized layer: absent Magnetic layer: Co/Ni thin film | — | +2.3 | +0.9 | +2.2 |
| 10 | Comparative Example 5 | 0.007 | Layer of vinyl chloride-vinyl acetate copolymer | 0.007 | −0.2 | ±0 | −0.1 |
| 11 | Example 6 | 0.020 | Polymerized layer: diethylene glycol diacrylate (70%) + vinyl chloride-vinyl acetate copolymer (30%) | 0.006 | +0.6 | +0.3 | +1.2 |
| 12 | Comparative Example 6 | 0.005 | Polymerized layer: diethylene glycol diacrylate | 0.005 | +0.9 | +1.0 | +1.9 |
| 13 | Comparative Example 7 | 0.005 | Polymerized layer: absent | — | +1.0 | +1.0 | +1.8 |

| | |
|---|---|
| Diethylene glycol diacrylate | 70 parts |
| Copolymer of vinyl chloride-vinyl acetate (polymerization degree: about 300) | 30 parts |
| Methyl ethyl ketone | 1,000 parts |

COMPARATIVE EXAMPLE 6

The same procedure as in Example 1 was repeated except that a polyethylene terephthalate film having a surface roughness of 0.005 μm on the back surface was used, to prepare Sample No. 12.

COMPARATIVE EXAMPLE 7

The same procedure as in Comparative Example 6 was repeated except without providing a layer which was harded by polymerization with radiation exposure, to prepare Sample No. 13.

It is apparent from the Table that a magnetic recording medium having remarkably improved video sensitivities and C/N ratios can be obtained by adjusting the surface roughness of the back surface of the support to have 0.007 μm or more and by providing a layer which is polymerized and hardened by radiation exposure, preferably to have a surface roughness of 0.005 μm or less, between the support and the magnetic layer. Further it is seen from the results in Comparative Examples 6 and 7 that the video sensitivity and C/N ratio are not improved when the surface roughness of the back surface of the support is less than 0.007 μm, even if the polymerized layer is provided between the support and the magnetic layer.

While the invention has been described in detail and with reference to specific embodiments thereof, it will be apparent to one skilled in the art that ravious changes

What is claimed is:

1. A magnetic recording medium comprising a non-magnetic support having coated thereon a non-magnetic layer and a magnetic layer in that order, with the surface roughness of the surface of the support on the side opposite from the magnetic layer being 0.007 μm or more, cut off of 0.25 mm, where the nonmagnetic layer is provided by coating and radiation-exposing a compound that is polymerizable by radiation exposure, wherein the non-magnetic layer has a surface roughness adjusted by utilizing a leveling effect to a value of 0.005 μm or less on the surface coated with the magnetic layer, and wherein the non-magnetic layer is formed by coating a layer of a composition containing the compound that is polymerizable by radiation exposure which has a viscosity of 300 cP or less, followed by exposiing the coated layer to radiation.

2. A magnetic recording medium as in claim 1, wherein the surface roughness of the surface of the support on the side opposite from the magnetic layer is from 0.007 μm to 0.5 μm.

3. A magnetic recording medium as in claim 1, wherein the surface roughness of the surface of the support on the side opposite from the magnetic layer is from 0.015 μm to 0.5 μm.

4. A magnetic recording medium as in claim 1, wherein the non-magnetic layer has a thickness of from 0.1 to 2 μm.

5. A magnetic recording medium as in claim 2, wherein the non-magnetic layer has a thickness of from 0.1 to 2 μm.

6. A magnetic recording medium as in claim 3, wherein the non-magnetic layer has a thickness of from 0.1 to 2 μm.

7. A magnetic recording medium as in claim 1, wherein the non-magnetic layer is formed by coating a layer of a composition containing a compound that is polymerizable by radiation exposure and which has a viscosity of 100 cP or less, followed by exposing the coated layer to radiation.

8. A magnetic recording medium as in claim 1, wherein the non-magnetic layer is formed by coating a layer of a composition containing a compound that is polymerizable by radiation exposure and which has a viscosity of 50 cP or less, followed by exposing the coated layer to radiation.

* * * * *